Patented Aug. 25, 1953

2,650,177

UNITED STATES PATENT OFFICE 2,650,177

RESIN PURIFICATION OF SUGAR SOLUTIONS

Hendrik Willem Meijer, Veendam, Netherlands, assignor to N. V. Octrooien Maatschappij "Activit," Amsterdam, Netherlands, a limited liability company of the Netherlands No Drawing. Application September 12, 1946, Serial No. 696,622. In the Netherlands January 9, 1941

Section 1, Public Law 690, August 8, 1946
Patent expires January 9, 1961

6 Claims. (Cl. 127—46)

My invention relates to the removal of impurities of organic nature, such as undesirable colouring, tasting and smelling substances, foam producing substances, substances inhibiting crystallization, and the like, from solutions of sugars. It may be applied inter alia to solutions of saccharose, maltose, fructose, dextrose and laevulose, such as the thin juice, the thick juice, the syrups and the molasses of the cane sugar and beet sugar industry, dissolved raw sugar, solutions of inverted sugar, aqueous dextrose, raw starch syrup, malt extracts, wood sugar solutions, etc.

It is known to remove from such sugar solutions the organic and usually high molecular organic impurities contained therein, by treatment with substances which possess a high adsorption power for the said impurities, such as silica gel, activated coal, bone charcoal, colloidal coal, bleaching earth and precipitated calcium carbonate or sulphite. My invention now provides for this purpose a novel adsorption agent with similar surface-active capillary-chemical properties, which possesses an extraordinary strong adsorption capacity for organic impurities present in aqueous liquids and which owing to its easy re-generatability is particularly cheap in its use.

According to my invention the sugar solutions are treated with water-insoluble resin gels containing at least phenolic hydroxyl as well as aromatic amino radicals in the macromolecules. Examples of such resins are the condensation products of aldehydes with both phenols and aromatic amines, which can readily be obtained in a highly porous form by condensation in aqueous medium.

In the preparation of the resins destined to the purposes of my invention by condensation care should be taken to produce a mass which is homogeneous as far as possible, for example by means of stirring during the condensation. The resulting condensation product should preferably have such a consistency, as to be suitable for use directly after its pulverization, if desired after being washed out. Care should be taken that the resins are steadily kept moist, since otherwise the adsorption capacity for the organic impurities is lost or considerably reduced. Consequently the resins should be transported and stored in a moist condition.

The use according to my invention of the surface active resins for the purification of sugar solutions can be combined with the usual juice purification methods in the same manner as has already been proposed for other adsorption agents. Thus it may be advisable to have the treatment with the active resins preceded by treatments such as filtration, carbonatation or sulphitation. Such treatments may also take place simultaneously with the purification according to my invention. I have found that it is particularly advantageous to remove previously any protein substances, which are present as a rule, as far as possible, e. g. by precipitation in the isoelectrical range by means of bentonite.

The surface active resins may be used in suspension as well as in fixed layers, if desired together with other adsorption agents or with filter aids.

An important advantage of the adsorption agents according to my invention consists therein, that they can always be regenerated in a simple manner, e. g. by treatment with lye and then with acid. By this means they substantially regain their original activity. Precisely this fact makes their technical application particularly advantageous.

During the aforesaid treatments with lye and acid changes in volume may occur, consisting in a swelling or in a shrinking of the resin-gels, which changes in volume depend upon the quantity of water or other medium, wherein the condensation to resin gel has taken place.

The volume which is ultimately occupied by the gel of a given quantity of synthetic resins and which evidently depends upon the quantity of the water used in the condensation, is very important for the decolourizing capacity of the resin. For every given synthetic resin there exists, however, a maximally attainable volume, seeing that otherwise it begins to possess too small a solidity, as a result of which it becomes unsuitable as adsorption agent. The difference in volume, occupied during the regeneration after the lye treatment and after the subsequent acid treatment is closely connected with the quantity of water or other condensation medium which was present during the condensation. In practice it is most important for obvious technical reasons that this volume remains as far as possible the same, in other words, that the aforesaid difference is as small as possible and that nevertheless one is in any case in a position to control this difference.

I have now found in this connection, that especially favourable results are attained when using my resin gels containing at least phenolic hydroxyl as well as aromatic amino radicals. In fact it turned out that such resins not only possess the capacity of removing organic impurities of the most divergent nature from sugar solutions, but that they do not show swelling or shrinking phenomena during the subsequent two stage regeneration.

In addition to the phenolic hydroxyl groups, acids groups like the —COOH, —SO₃H, and

—CH₂SO₃H may be present in the phenolic body; whilst in addition to aromatic amino groups basic groups like =NH-(imino) may be attached to the aromatic amino radical.

With special advantage use may be made of itimate mixtures of condensation products of aldehyde and/or polyhalides with aromatic amines or imines. Suitable decolorizing resins can be obtained by the combination of an aldehyde and a phenol and an aromatic amine.

When regenerating a basic resin (e. g. an aldehyde-amine-condensation-product) with acid, its volume increases, whilst on the contrary the volume of an acid resin (e. g. a phenol-aldehyde resin) decreases during the same treatment. Now when using a mixed resin according to my invention practically no change in volume takes place during the acid treatment, the mechanical contracting and extending forces keeping each other in equilibrium. The same applies for the regeneration with lye. Since the aforesaid changes in volume which take place in opposite directions do not necessarily occur to the same extent, different amounts of both resin components should be used in the mixed resin in order to keep the changes in volume during the acid or lye treatment as low as possible.

By variation of the number and nature of the acid groups and the number and nature of the basic groups it is not only possible to restrict as much as possible the changes in volume of the resins utilized, but this change can also be adjusted to a value, which is the most favourable for the restoration of the adsorption capacity.

Example I 25 g. m-phenylenediamine, 25 g. resorcine and 15 cm.³ hydrochloric acid are dissolved in 250 cm.³ water. Then 100 cm.³ methanal solution of 40% concentration are added, a resin gel being formed thereby, which is hardened at 95° C. under the surface of water. The resulting resin is first treated with a NaOH-solution of 10% concentration and—after washing out of the lye—with hydrochloric acid 1:1, whereupon the acid is likewise washed out.

A glucose solution obtained by conversion of a strongly polluted tertia-potato flour, which solution is freed from protein substances by precipitation, is almost completely decolourized by the resulting resin. The ash contents of the glucose solution remain practically unchanged before and after the purification. During the regeneration of the mixed resin the volume remains substantially constant in the treatment with lye as well as in that with acid.

Example II

Excellent results are also obtained with a resin prepared as follows: 9.5 kg. meta-phenylenediamine, 7.6 kg. resorcine, 37.5 litres water and 15.7 kg. hydrochloric acid of 9.2° Bé. are dissolved together with thorough stirring. Then 21 litres of methanal solution of about 40% concentration are added in one single portion whilst stirring. The resin solidifies after about 5 minutes, whereupon methanal solution of about 10% concentration is poured on it. The reaction is carried out in an insulated vessel and the temperature rises to 75-80° C. The resin is left standing for 24 hours, granulated and thoroughly washed out, whereupon it is ready for use.

Example III 30 g. m-phenylenediamine and 30 cm.³ hydrochloric acid are dissolved in 250 cm.³ of water and 50 g. resorcine-sulphite-methanal resin are added to the solution in an exceedingly finely comminuted state. 100 cm.³ of methanal-solution of 40% concentration are then added to the resulting suspension.

The resin obtained in this manner decolourizes excellently the glucose solution referred to in Example II, its volume remaining constant. Here too the ash contents show practically no change. Also during the regeneration with lye and with acid the volume remains constant.

Example IV

A buffer solution containing sodium acetate and acetic acid and having a pH of 5.50 is passed over the pulverized and washed resin of Example II, whereupon the buffered resin gel is washed with water until it is freed of acetate. Then a strongly yellow coloured glucose solution with a pH of 4.8 is passed over the resin gel. The glucose solution flowing off is completely decolourized, the pH remaining at 5.46. The ash contents of the original glucose solution amount to 0.39% and of the glucose solution flowing off to 0.38%. The adjustment of the pH of the glucose solution has taken place simultaneously with the decolouration.

I claim as my invention:

1. Process for the removal of impurities of organic nature from a molasses solution which comprises contacting said solution with an undried resin resulting from the condensation of a mixture of resorcinol and meta-phenylene diamine with formaldehyde in the presence of a quantity of water sufficient to provide desired porosity and maintaining said resin in a moist condition until said contact is effected.

2. Process as in claim 1, wherein said mixture contains equal parts by weight of resorcinol and meta-phenylene diamine.

3. Process for the removal of impurities of organic nature from a sugar solution, which comprises contacting said solution with an undried resin resulting from the condensation of a phenol and an aromatic amine with an aldehyde in the presence of a quantity of water sufficient to provide desired porosity and maintaining said resin in a moist condition until said contact is effected.

4. Process for the removal of impurities of organic nature from a sugar solution, which comprises contacting said solution with an undried resin resulting from the condensation of a phenol and an aromatic amine with formaldehyde in the presence of a quantity of water sufficient to provide desired porosity and maintaining said resin in a moist condition until said contact is effected.

5. Process for the removal of impurities of organic nature from a sugar solution, which comprises contacting said solution with an undried resin resulting from the condensation of a mixture of resorcinol and an aromatic amine with formaldehyde in the presence of a quantity of water sufficient to provide desired porosity and maintaining said resin in a moist condition until said contact is effected.

6. Process for the removal of impurities of organic nature from a sugar solution, which comprises contacting said solution with an undried resin resulting from the condensation of a phenol and meta-phenylene diamine with formaldehyde in the presence of a quantity of water sufficient to provide desired porosity and maintaining said resin in a moist condition until said contact is effected.

HENDRIK WILLEM MEIJER.

References Cited in the file of this patent

UNITED STATES PATENTS

| Number | Name | Date |
|---|---|---|
| 2,094,359 | Kirkpatrick | Sept. 28, 1937 |
| 2,104,501 | Adams et al. | Jan. 4, 1938 |
| 2,191,365 | Boyd | Feb. 20, 1940 |
| 2,191,853 | Holmes | Feb. 27, 1940 |
| 2,251,234 | Swain | July 29, 1941 |
| 2,264,654 | Boyd | Dec. 2, 1941 |
| 2,275,210 | Urbain | Mar. 3, 1942 |
| 2,301,669 | Richter | Nov. 10, 1942 |
| 2,319,649 | Walsh | May 18, 1943 |
| 2,328,191 | Cantor | Aug. 31, 1943 |
| 2,330,785 | Walsh | Sept. 28, 1943 |
| 2,341,907 | Cheetham | Feb. 15, 1944 |
| 2,388,222 | Behrman | Oct. 30, 1945 |
| 2,389,119 | Cantor | Nov. 20, 1945 |
| 2,389,865 | Mills et al. | Nov. 27, 1945 |
| 2,391,843 | Rawlings | Dec. 25, 1945 |
| 2,412,855 | Auten | Dec. 17, 1946 |
| 2,413,844 | Rawlings | Jan. 7, 1947 |

FOREIGN PATENTS

| Number | Country | Date |
|---|---|---|
| 474,978 | Great Britain | Nov. 2, 1937 |
| 489,173 | Great Britain | July 20, 1938 |
| 509,710 | Great Britain | July 19, 1939 |
| 116,691 | Australia | Mar. 9, 1943 |
| 117,410 | Australia | Sept. 2, 1943 |

OTHER REFERENCES

Myers: "Synthetic-Resin Ion Exchangers," The Resinous Products Company, Philadelphia, Pennsylvania, appearing in "Advances in Colloid Science," 1942, pages 348 to 350 pertinent.

Serial No. 359,575, Smit (A. P. C.), published May 11, 1943.